United States Patent Office 3,420,434
Patented Jan. 7, 1969

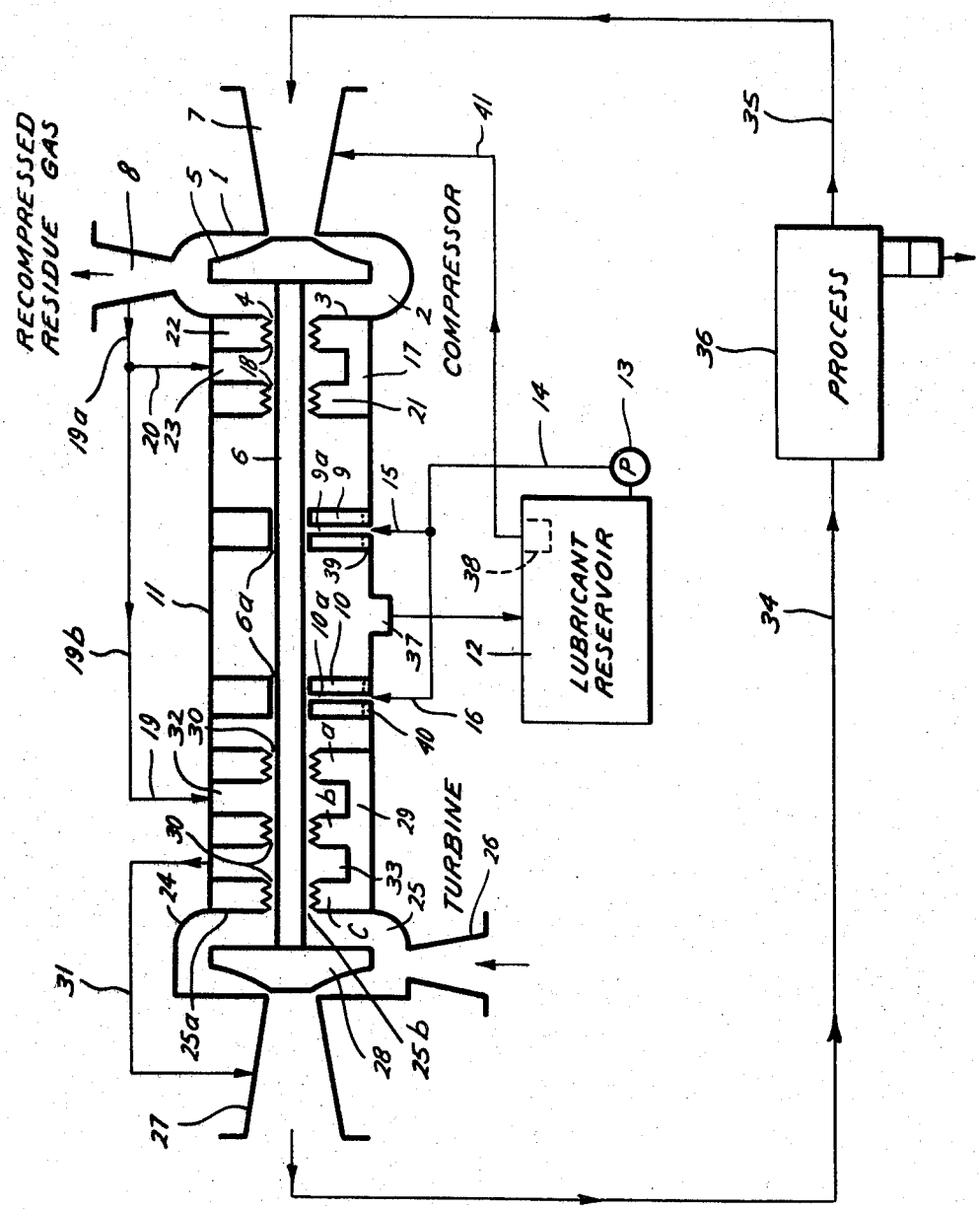

3,420,434
ROTARY COMPRESSORS AND SYSTEMS EMPLOYING SAME USING COMPRESSOR GAS AS SEAL GAS
Judson S. Swearingen, 500 Bel Air Road, Los Angeles, Calif. 90024
Filed Dec. 30, 1966, Ser. No. 606,429
U.S. Cl. 230—116     14 Claims
Int. Cl. F04d *25/04;* F04b *39/02*

ABSTRACT OF THE DISCLOSURE

A rotary compressor is illustrated including a chamber with an outlet discharging gas under pressure from the chamber, and a shaft emerging from the chamber. The shaft is supported for rotation by at least one bearing disposed in a housing and lubricated by liquid injected under pressure not greater than the pressure of the gas in the compressor outlet. The shaft is sealed between where it passes from the chamber and the bearing housing by a labyrinth seal, and further sealed by injecting compressor gas from the compressor outlet into the labyrinth seal intermediate its ends so that the pressure of the gas prevents lubricant from flowing into the compressor. A turbine may be connected to the compressor shaft on the opposite side from the bearing housing, and a second labyrinth seal extends along the shaft between the turbine and the bearing housing to seal therebetween. Additional sealing is provided by injecting gas from the compressor outlet into the second labyrinth seal intermediate its ends to prevent lubricant from passing through the second labyrinth seal, and by venting the second labyrinth seal at a point intermediate the injection of the compressor gas and turbine to the turbine outlet so that gas from the turbine chamber does not pass into the bearing housing.

This invention relates to rotary compressors and systems employing same and more particularly to seals used in such systems. In one of its preferred forms, this invention relates to such a system wherein compressor gas is used as a seal gas in combination with a labyrinth seal along a rotary shaft drivingly connecting a turbine and a compressor, to prevent lubricants, lubricating the shaft as it is supported for rotation, from passing into the turbine or compressor.

Rotary compressors may operate at extremely high rotating speeds. This is generally true, for example, when the compressor is drivingly connected by a common shaft to a turboexpander wherein a pressurized stream of gas to be treated is expanded while doing mechanical work. The compressor is driven by such mechanical work, and compresses the stream as it is discharged for disposition. Because of the high rotating speeds which may be obtained, rubbing type seals are not practical for use in sealing the shaft as it emerges from the housing of the compressor and the turboexpander, and labyrinth type seals are conventionally used for this purpose, even though they may leak a moderate amount of gas.

Also, the shaft is generally supported for rotation by one or more bearings between the points where it emerges from the turboexpander and compressor housings, respectively. These bearings must be lubricated, and this is conventionally done by forcing a liquid lubricant under pressure into the bearing. It is desirable and sometimes mandatory that the lubricant be prevented from entering the turboexpander or compressor where it may disturb the gases in these machines or be lost. Because of this, and because the labyrinth seals permit leakage, care must be taken to insure that the lubricant is not permitted to enter the compressor or turboexpander through these seals. Also, the stream passing through the turboexpander may contain condensible components which would harm the lubricant and care must be taken to insure that the gas containing these components does not pass the labyrinth seals and mix with the lubricant. An important advantage of this invention is that the necessary sealing is provided, without the use of external seal gas, by using the compressor gas from within the compressor or from the compressor discharge as the seal gas.

It is an object of this invention to provide a rotary compressor and system employing the same wherein the compressor gas is used as a seal gas to prevent the lubricant, employed in lubricating the compressor shaft as it is supported for rotation, from entering the compressor.

It is another object of this invention to provide a rotary compressor driven through a common shaft by a turbine containing gas having condensible components, wherein the compressor gas is used as a seal gas to prevent leakage between the interior of the turbine and a bearing housing containing lubricants employed in lubricating the shaft as it is supported for rotation.

The labyrinth seals used to seal along a shaft rotating at high speed in such a system will wear a certain amount, and it is a further object of this invention to provide a rotary compressor and system employing same where compressor gas is used as a seal gas and in which the seal gas pressures adjust themselves to compensate for the wear of the labyrinth seals employed.

Other objects and advantages of this invention will become apparent during the course of the following description and with reference to the accompanying drawing illustrating a preferred embodiment of this invention.

In the single figure of this drawing is shown diagrammatically in longitudinal cross section an embodiment of this invention in which a rotary compressor is driven by a turboexpander through a common shaft.

In the illustrated example of this invention a rotary compressor has a chamber with an outlet discharging gas under pressure from the chamber and a shaft emerging from the chamber. The shaft is supported for rotation by at least one bearing disposed in a housing and lubricated by liquid injected under pressure. The pressure of the lubricant where the shaft enters the bearing housing for the compressor is not greater than the pressure of the gas in the compressor outlet. The shaft is sealed between where it emerges from the chamber and the bearing housing by a labyrinth seal, and by injecting compressor gas as from the compressor outlet into the labyrinth seal intermediate its ends, so that the pressure of this gas prevents the lubricant from flowing into the compressor.

In one embodiment of this invention the compressor is driven by a turbine having a chamber containing gas under higher pressure than the gas in the compressor outlet, and an outlet discharging gas from said chamber at a lower pressure than the gas in the compressor outlet. The gas in the turbine chamber may contain condensible components which would harm the lubricant if mixed therewith. The turbine is connected to the compressor shaft on the opposite side from the bearing housing and a second labyrinth seal is provided extending along the shaft between the turbine and the bearing housing to seal therebetween. Further sealing is provided to prevent leakage of the gas in the turbine chamber to the bearing housing by injecting gas from the compressor outlet into the second labyrinth seal intermediate its ends so that the pressure of this prevents lubricant from entering the second labyrinth seal. The second labyrinth seal is also vented to the turbine outlet containing the lower pressure gas at a point intermediate the injection point described and the turbine. This discharge into a lower pressure region causes any gas from the turbine chamber in the second labyrinth seal to pass to the turbine outlet and none passes into the bearing housing.

In the drawing there is illustrated a rotary compressor 1, which in the embodiment shown is a centrifugal compressor. The compressor 1 has a chamber 2 with a wall 3 having an opening 4. A rotor 5 is disposed in the chamber 2 and is connected to a shaft 6 which passes through the opening 4 of the wall 3. The chamber 2 also has an inlet 7 and an outlet 8 for discharging gas under pressure from the chamber 2. As is conventional, gas entering the inlet 7 is compressed by the centrifugal action of the rotor 5 and discharged for disposition from the outlet 8.

The shaft 6 is closely surrounded by at least one member to form a close clearance 6a between the shaft 6 and the member. This member may be a bearing supporting the shaft for rotation. In the embodiment illustrated the shaft 6 is supported for rotation by bearings 9 and 10 which are in an enclosed bearing housing 11 along the shaft 6 and outside the compressor chamber 2 and include ducts 9a and 10a respectively for passage of a lubricant injected under pressure. A means is provided for injecting liquid in sufficient quantity into the clearance 6a to close same, such as, into the bearings under pressure for lubrication thereof. The pressure of this lubricant where the shaft enters the bearing housing from the compressor is not greater than the pressure of the gas in the outlet 8. As shown, this means includes a reservoir of lubricant 12, a pump 13, flow line 14, and flow lines 15 and 16, which are respectively connected to the bearings 9 and 10 through ducts 9a and 10a so that the lubricant is injected into these bearings under pressure and flows between the bearings and the shaft 6 for lubrication as the shaft is rotated.

Extending along the shaft 6 from the chamber wall 2 to the bearing housing 11 is a labyrinth seal 17 which leaves a restricted flow passage 18 between the interior of the compressor and the interior of the bearing housing. In the embodiment shown the labyrinth seal 17 has two annular sealing members 21 and 22 and an annular chamber 23 between the members 21 and 22.

A means is provided for injecting gas under pressure in the outlet 8 into the labyrinth seal at a point intermediate the ends thereof. This means is illustrated as the flow lines 19a and 20 connecting the outlet 8 to the labyrinth seal 17. The line 20 is connected to the chamber 23 and conducts gas from the outlet 8 into this chamber.

Gas flowing into the chamber 23 under pressure will leak towards each end of the labyrinth seal 17 through the passageway 18. Since this gas is at a higher pressure than the gas in the compressor chamber 2 and the lubricant in the bearing housing 11, the gas in the labyrinth seal will leak in to the compressor chamber 2 and the bearing housing 11. In this way, lubricant in the housing 11 will be prevented from flowing into the chamber 2 and mixing with the process gas therein. The sealing members 21 and 22 are close fitting and only a small amount of the gas from the compressor outlet, for example, 1 c.f.m. flows into the bearing casing and the chamber 2. This restricted rate of flow is adequate for sealing the lubricant and conserves the seal gas pressures.

A turbine may also be connected to the shaft on the opposite side of the bearing housing from the compressor and may drive the compressor. This turbine is shown in the drawing as a turboexpander 24 having a chamber 25 with an inlet 26 for receiving gas usually at a higher pressure than that in the compressor outlet 8, and an outlet 27 discharging gas at a pressure lower than the gas in the compressor outlet 8. The chamber 25 also has a wall 25a with an opening 25b therethrough. A rotor 28 is disposed in the chamber 25 and is connected to the shaft 6 extending through the opening 25b so that the turbine rotor 28 and the compressor rotor 5 are drivingly connected together by the shaft 6 for rotation in unison.

As illustrated in the drawing, gas under higher pressure than the gas in the compressor outlet 8 enters the inlet 26 and the chamber 25 of the turbine 24 and is expanded while doing mechanical work in driving the turbine rotor 28. This expanded gas is discharged at lower pressure through the outlet 27 for disposition. The gas passing through the turbine may contain condensible components which would harm the lubricant lubricating the bearings if it mixes therewith and the lubricant itself may harm the gas in the turbine.

Extending along the shaft from the chamber wall to the bearing housing is a second labyrinth seal 29 which seals between the interior of the turbine and the bearing housing. The seal includes a restricted flow passageway 30 communicating between the interior of the turbine and the bearing housing. The second labyrinth seal 29 is illustrated in the drawing as having three sealing members a, b, and c, with annual chambers 32 and 33 between the sealing members respectively. These sealing members are close fitting and only a small amount of gas flow occurs in the passageway 30.

A means is provided for injecting gas under pressure from the outlet 8 into the second labyrinth seal at a point intermediate the ends thereof. As illustrated, this means includes flow lines 19, 19a and 19b through which the gas is conducted into the restricted flow passageway 30, such as through the chamber 32 as illustrated in the drawing, wherein it flows both toward and into the bearing housing and toward the compressor chamber. That which flows into the interior of the bearing housing 11 is of sufficient pressure to prevent the lubricant in the housing from flowing into the passageway 30.

Means is also provided for venting the labyrinth seal to the turbine outlet 27 at a point intermediate the point of injection of the gas from the outlet 8 and the turbine chamber wall 25a. This means is illustrated as a flow line 31 conducting gases from the passageway 30, such as through the annular chamber 33, to the turbine discharge 27, which is at a lower pressure than the pressure of the gas in the outlet 8. Gas from the outlet 8 leaking in the passageway 30 towards the turbine 24 and gas leaking from the turbine chamber 25 into the passageway 30 is vented by the line 31 to the lower pressure region in the discharge 27. In this manner the gas in the chamber 25 containing the harmful condensible components is prevented from entering the bearing housing 11 and mixing with the lubricant.

The gas in the turbine chamber 25 will usually be, but on occasion may not be, higher than the gas in the compressor outlet 8. In this case, by proper adjustments of the openings through the labyrinth seals 29b and 29c and line 31, gas from the compressor chamber 8 will vent out the line 31 and only a small portion or none at all will pass into the turbine chamber 25. As described above, the lubricant will be prevented from entering the turbine chamber.

The pressure in the compressor chamber 2, and particularly at the opening 4, is partly determined by compressor design. Generally this pressure is not as high as the pressure in the outlet 8, but it is frequently about two-thirds as high. Therefore, it may be at a sufficient pressure at the opening 4 to prevent the leakage of lubricant and the leakage of gas in the turbine chamber 25 through the labyrinth seals. In this case there is no necessity for flow line 19a as gas leaking from the chamber 2 through the seal 17 leaks into the bearing housing and prevents the flow of lubricant into the chamber 2. A means is provided in this embodiment for injecting sealing gas from the passageway 18 into the second labyrinth seal 29. This means is shown at the lines 19b and 20 and the gas is injected into the labyrinth 29 and seals the passageway 30 in the manner previously described.

This arrangement has the advantage of using less seal gas than where the gas in the compressor outlet is used for the seal gas. Also, the sealing members 21 and 22 will wear an equal amount, and if the flow through one is greater due to wear, the flow through the other will likewise be greater. In this manner the pressures in the line 19b will be maintained reasonably constant.

If the gas in the compressor chamber 2 is of sufficient pressure to seal the passageway 18, but is not of sufficient pressure to seal in the passageway 30 of the labyrinth seal 29, the gas in the compressor outlet 8 can be used for this latter sealing only. The flow lines 19a and 19b would be connected to conduct the gas in the outlet 8 to the labyrinth seal 29 and the flow line 20 would be eliminated.

The turboexpander-compressor combination described above, may be utilized in combination with a processing means wherein a stream of gas passing through the turbine is acted upon so that any condensibles which the gas contains are removed. This means is illustrated as a processing means 36 having an inlet 34 connected to the turbine discharge 27 and an outlet 35 connected to the compressor input 7. Thus the stream and any condensible components contained therein are discharged from the turbine 24 and into the processing means 36. After removal of the condensibles this stream is then discharged from the processing means outlet 35 into the compressor inlet 7 where it is compressed and discharged to the outlet 8 for disposition. A portion of this gas discharged is utilized as the seal gas as described above by injection into the labyrinth seals, after the condensible components are removed, so that the seal gas does not contain components which will harm the lubricant.

A closed cycle lubrication system may be provided with this invention in which used lubricant and the seal gas escaping into the bearing housing are conserved. The bearing housing 11 is shown with a gravity drain 37 connected to the reservoir 12 for the drainage of the used lubricant and seal gas in the bearing housing. Also, the bearings 9 and 10 include respectively drain ducts 39 and 40 offset from the ducts 9a and 10a for passage of lubricants from the ends of the bearing housing to the drain 37. The drained lubricant is returned by the pump 13 for further lubrication. The drained seal gas may be separated from the lubricant and returned to the stream entering the compressor 1 in which the condensibles have been previously removed. For this purpose a means is provided, such as a mist eliminator 38 in the reservoir 12, and the flow line 41 connected to the compressor inlet 7.

In the illustrated embodiment, because the bearing housing 11 is freely vented to the compressor inlet 7 through the drain 37, reservoir 12, and flow line 41, the bearing housing is pressurized substantially at compressor inlet 7 pressure.

From the foregoing it will be seen that this invention is one well adapted to attain all of the ends and objects hereinabove set forth, together with other advantages which are obvious and which are inherent to the apparatus and system employing the same.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In combination with a rotary compressor including a shaft, a housing having a chamber, said chamber having a wall with an opening therethrough through which the shaft extends and an outlet for discharging gas under pressure from said chamber, a liquid containing housing along the shaft outside the chamber and including at least one member closely surrounding the shaft with a clearance thereabout, means for injecting liquid into the clearance in sufficient quantity to close the same and under pressure such that the pressure within the liquid containing housing where the shaft enters the housing from the compressor is not greater than the pressure of a gas in the compressor outlet, and a labyrinth seal extending along the shaft from the housing to the chamber wall, and a turbine on the shaft and on the opposite side of the housing from the compressor, said turbine having a chamber containing gas under pressure, and said turbine chamber having a wall with an opening therethrough through which the shaft extends and an outlet for discharging gas at a pressure lower than the gas in said compressor outlet, and a second labyrinth seal extending along the shaft from the housing to the turbine chamber wall, the improvement [further] comprising, in combination, means for injecting gas from said compressor outlet into said labyrinth seal at a point intermediate the ends thereof, means for injecting gas from said compressor outlet into said second seal at a point intermediate the ends thereof, and means for venting gases from a point intermediate the point of injection of the gas from the compressor outlet and the turbine chamber wall to said turbine chamber outlet whereby the liquid injected into said clearance is prevented from passing into the compressor chamber and the turbine chamber by the pressure of said gas.

2. The combination of claim 1 wherein said first mentioned labyrinth seal includes two sealing members with an annular chamber therebetween and the means injecting the gas from the compressor outlet into said seal is connected to said annular chamber for injecting said gas therein, and said second labyrinth seal includes three sealing members with annular chambers therebetween and the means injecting the gas from the compressor outlet into said second seal is connected for the injection of said gas therein to the annular chamber adjacent the sealing member on the housing end of the second seal, and the venting means is connected to the other annular chamber in said second seal for venting gases therefrom.

3. The combination of claim 1 wherein said turbine chamber contains gas under higher pressure than the gas in said compressor outlet whereby the gas in said turbine chamber is prevented from passing through said second labyrinth seal into said housing.

4. The combination of claim 1 wherein the turbine is a turboexpansion machine adapted to receive an incoming stream of gas containing condensible components which is expanded while doing mechanical work and discharged from the turbine through said turbine outlet, and said compressor is driven by said mechanical work, and further including a processing means adapted to remove the condensible components from said stream having an inlet connected to the turbine outlet and an outlet connected to the compressor, so that said stream of gas may pass through said processing means for said removal and pass to the compressor after such removal where it may be compressed and discharged through the compressor outlet whereby the gas from said compressor outlet injected into said labyrinth seals is taken from said stream of gas after the condensible components are removed therefrom.

5. The combination of claim 4 wherein said first mentioned labyrinth seal includes two sealing members with an annular chamber therebetween and the means injecting the gas from the compressor outlet into said seal is connected to said annular chamber for injecting said gas therein, and said second labyrinth seal includes three sealing members with annular chambers therebetween and the means injecting the gas from the compressor outlet into said second seal is connected for injection of said gas therein to the annular chamber adjacent the sealing member at the housing end of the second seal and the venting means is connected to the other annular chamber in said second seal for venting gases therefrom.

6. The combination of claim 5 wherein the housing includes a drain for draining liquid and gas from said housing, and further including a reservoir connected to said drain for receipt of at least said drained liquid therefrom, and means separating the drained gas from the drained liquid and injecting said separated gas into said stream of gas before compression thereof.

7. In combination with a rotary compressor containing a gas under pressure having a shaft extending therefrom and an outlet for discharging gas under pressure from the compressor, a liquid containing housing along the shaft outside the compressor and including at least one member closely surrounding the shaft with a clearance thereabout, means for injecting liquid into the clearance in sufficient quantity to fill the same under pressure such that the pressure within the liquid containing housing where the shaft enters the housing from the compressor is not greater than the pressure of the gas in the compressor, a turbine on said shaft and on the opposite side of the housing from the compressor, said turbine having a chamber containing gas under pressure, said turbine chamber having a wall with an opening therethrough through which the shaft extends and an outlet for discharging gas under lower pressure than the gas in said compressor, and a labyrinth seal extending along the shaft from the housing to the turbine chamber wall, the improvement comprising means for injecting the gas from the compressor into said labyrinth seal at a point intermediate the ends thereof to cause the gas to flow along the shaft both toward the housing to keep the liquid therein from flowing along the shaft into the turbine chamber and toward the turbine chamber, and means for venting gases from a point intermediate the injection of the gas from the compressor and the turbine chamber wall to said turbine chamber outlet whereby the gas from the compressor outlet that flows along the shaft toward the turbine and the gases flowing along the shaft into the labyrinth seal from the turbine will flow into the turbine chamber outlet to prevent the gas from the turbine from passing through the labyrinth, entering the housing, and contaminating the liquid therein.

8. The combination of claim 7 wherein said turbine chamber contains gas under higher pressure than the gas in said compressor outlet [whereby the gas in said turbine chamber is prevented from passing through the labyrinth seal into the housing].

9. In combination with a rotary compressor containing a gas under pressure having a shaft extending therefrom and an outlet for discharging gas under pressure from the compressor, a liquid containing housing along the shaft outside the compressor and including at least one member closely surrounding the shaft with a clearance thereabout, means for injecting liquid into the clearance in sufficient quantity to fill the same under pressure such that the pressure within the liquid containing housing where the shaft enters the housing from the compressor is not greater than the pressure of the gas in the compressor, a turbine on said shaft and on the opposite side of the housing from the compressor, said turbine having a chamber containing gas under pressure, said turbine chamber having a wall with an opening therethrough through which the shaft extends and an outlet for discharging gas under lower pressure than the gas in said compressor, and a labyrinth seal extending along the shaft from the housing to the turbine chamber wall, the improvement comprising means connected to the compressor outlet for injecting the gas therefrom into said labyrinth seal at a point intermediate the ends thereof, and means for venting gases from a point intermediate the injection of the gas from the compressor and the turbine chamber wall to said turbine chamber outlet whereby the liquid injected into said clearance is prevented from passing into the turbine chamber.

10. The combination of claim 9 wherein the turbine is a turboexpansion machine adapted to receive an incoming stream of gas containing condensible components which is expanded while doing mechanical work and discharged from the turbine through said turbine outlet, and said compressor is driven by said mechanical work, and further including a processing means adapted to remove the condensible components from said stream having an inlet connected to the turbine outlet and an outlet connected to the compressor, so that said stream of gas may pass through said processing means for said removal and pass to the compressor after such removal where it may be compressed and discharged through the compressor outlet whereby the gas from said compressor outlet injected into said labyrinth seals is taken from said stream of gas after the condensible components are removed therefrom.

11. The combination of claim 10 wherein said labyrinth seal includes three sealing members with annular chambers therebetween and the injecting means is connected for the injection of gas from the compressor outlet into the annular chamber adjacent the sealing member at the bearing housing end of the seal, and the venting means is connected to the other annular chamber for venting gases therefrom.

12. The combination of claim 11 wherein the housing includes a drain for draining liquid and gas from said housing, and further including a reservoir connected to said drain for receipt of at least said drained liquid therefrom, and means separating the drained gas from the drained liquid and injecting said separated gas into said stream of gas before compression.

13. In combination with a rotary compressor having a shaft extending therefrom, a housing along the shaft outside the compressor and including at least one member closely surrounding the shaft with a clearance thereabout, means for injecting liquid under pressure into the clearance in sufficient quantity to fill the same, a turbine on said shaft and on the opposite side of the housing from the compressor, said turbine having a chamber containing gas under pressure, said turbine chamber having a wall with an opening therethrough through which the shaft extends and an outlet for discharging gas under lower pressure than the gas in said chamber, a seal extending along the shaft from the housing to a point intermediate the housing and chamber wall, and a labyrinth seal extending along the shaft from said intermediate point to the turbine chamber wall and providing a leakage path between said housing and said turbine chamber so that leakage of liquid into said turbine chamber and gas from said turbine chamber into said housing may occur, the improvement comprising means for injecting a seal gas into said seal between said housing and intermediate point, means for venting gases including said injected gas leaking through said seal and gas from said turbine chamber leaking through said labyrinth seal from said point intermediate the housing and the turbine chamber wall to said turbine chamber outlet whereby the liquid injected into said clearance is prevented from passing into the turbine chamber and gas in the turbine chamber is prevented from contaminating said liquid.

14. The combination of claim 13 wherein said seal and labyrinth seal are one labyrinth seal including three sealing members with annular chambers therebetween and the means for injecting the seal gas is connected for injection of such gas into the annular chamber adjacent the sealing member on the housing end of said one labyrinth seal, and the venting means is connected to the other annular chamber in said one labyrinth seal for venting gases therefrom.

References Cited

UNITED STATES PATENTS

| 2,326,824 | 8/1943 | Browne et al. | 230—132 |
| 2,822,974 | 2/1958 | Mueller | 230—207 |
| 2,877,945 | 3/1959 | Trebilcock | 230—116 |
| 2,910,328 | 10/1959 | Frolich | 308—36.3 |
| 3,302,951 | 2/1967 | Olesen | 277—15 |

FOREIGN PATENTS

| 719,489 | 10/1965 | Canada. |
| 766,531 | 1/1957 | Great Britain. |

HENRY F. RADUAZO, *Primary Examiner.*

U.S. Cl. X.R.

253—39; 230—206, 132